US007054907B1

(12) United States Patent
Sherwood

(10) Patent No.: US 7,054,907 B1
(45) Date of Patent: May 30, 2006

(54) SYSTEMS AND METHODS FOR BLOCKING DELIVERY OF AN ELECTRONIC COMMUNICATION

(75) Inventor: Amy L. Sherwood, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 712 days.

(21) Appl. No.: 10/025,954

(22) Filed: Dec. 26, 2001

(51) Int. Cl.
*G06F 15/16* (2006.01)

(52) U.S. Cl. .................... 709/206; 709/206; 709/207

(58) Field of Classification Search ......... 709/204–207
See application file for complete search history.

(56) References Cited

U.S. PATENT DOCUMENTS

| 6,052,709 | A | * | 4/2000 | Paul ........................... 709/202 |
| 6,199,102 | B1 | * | 3/2001 | Cobb .......................... 709/206 |
| 6,321,267 | B1 | * | 11/2001 | Donaldson .................. 709/229 |
| 6,330,590 | B1 | * | 12/2001 | Cotten ........................ 709/206 |
| 6,421,709 | B1 | * | 7/2002 | McCormick et al. ....... 709/206 |
| 6,775,689 | B1 | * | 8/2004 | Raghunandan .............. 709/206 |
| 6,842,773 | B1 | * | 1/2005 | Ralston et al. .............. 709/206 |
| 6,868,498 | B1 | * | 3/2005 | Katsikas ..................... 713/201 |

* cited by examiner

Primary Examiner—Glenton B. Burgess
Assistant Examiner—Yasin Barqaqdle
(74) Attorney, Agent, or Firm—Thomas, Kayden, Horstemeyer & Risley

(57) ABSTRACT

Embodiments of the present invention relate to systems and methods for blocking delivery of an electronic communication. In an embodiment, a method includes receiving at least a portion of a first electronic communication that includes a first electronic communication source address and a first electronic communication recipient address. User electronic communication blocking profile data is accessed, in which the user electronic communication blocking profile data includes a plurality of user electronic communication blocking records. Each user electronic communication blocking record of at least a subset of the plurality of user electronic communication blocking records includes a recipient identifier field to store a recipient identifier and a sender identifier field to store a sender identifier. A first user electronic communication blocking record is selected based at least in part on the first electronic communication source address and the first electronic communication recipient address. Delivery of the first electronic communication to the first electronic communication recipient address is blocked based at least in part on the selected first user electronic communication blocking record.

7 Claims, 6 Drawing Sheets

SYSTEMS AND METHODS FOR BLOCKING DELIVERY OF AN ELECTRONIC COMMUNICATION

BACKGROUND OF THE INVENTION

1. Field of the Invention

Embodiments of the present invention relate to an electronic communication. More particularly, embodiments of the present invention relate to systems and methods for blocking delivery of an electronic communication.

2. Background Information

Electronic mail ("e-mail") users typically receive unwanted electronic mail. Sources of unwanted electronic mail include junk e-mailers. Junk e-mailers are also known as spammers, and junk e-mail is often referred to as spam. The Webopedia (see http://webopedia.internet.com) includes a detailed description of spam and the origination of the term. It defines spam as encompassing electronic junk mail and explains that spam is generally e-mail advertising for products or services sent to a mailing list or newsgroup. The Webopedia explains that spam wastes people's time with unwanted e-mail and consumes a lot of network bandwidth.

Newton's Telecom Dictionary defines spam as unwanted e-mail and explains that the term is derived from the canned spiced ham product that splatters messily when hurled. Likewise, electronic spam sent by a junk mailer splatters messily across a network, and recipients of the spam—who typically never requested the spam—are left to deal with the mess of downloading, receiving, or deleting the spam.

Another source of unwanted e-mail can be a source that once was not an unwanted e-mail source but became an unwanted e-mail source. For example, a user can sign up to receive informational e-mails. Around tax preparation time, a user may subscribe to a tax hints e-mail newsletter. The tax hints e-mail may be worthwhile to the user prior to filing of a tax return, but become annoying to the user after the tax return has been filed. Alternatively, the tax hints e-mail may not be what the user expected (e.g., too complicated, too simple, light on content and heavy on advertising, etc.). Notwithstanding a user's effort to unsubscribe from the mailing list, the tax hints e-mail may continue to be sent to the user due to technical problems of the tax hints e-mailer, delays in processing unsubscribe requests, or an unethical e-mailer.

A further source of unwanted e-mail can be a company that receives a user's e-mail address as part of a product registration process and then uses the e-mail address to send the user unsolicited product hints, upgrade offers, product newsletters, special offers, and so on.

A user may also receive unwanted e-mail from an individual. For example, a user can be one of two persons that were formerly friends, associates, colleagues, neighbors, dating, married, related, acquaintances, or otherwise associated. The user may no longer want to receive any e-mail from the other person.

FIG. 1 is a schematic diagram of a known system for processing unwanted e-mail. Computer 40 can be a computer or server of an unwanted e-mailer that sends an unwanted e-mail 50. The unwanted e-mail 50 can be sent to a user (e.g., user@network.net). The junk e-mailer can send unwanted e-mail 50 to an internet service provider ("ISP") 60 (step 101). ISP 60 can send the unwanted e-mail 50 to a server 70 associated with the user (step 102). Server 70 can be a mail server associated with the user, a server of an ISP associated with the user, and so on. The server 70 then sends the unwanted e-mail 50 to a computer 110 of the user (step 103). Computer 110 can include a processor 111 coupled via a bus 112 to network port 113 and memory 114.

Processor 111 can be, for example, an Intel Pentium® 4 processor, manufactured by Intel Corp. of Santa Clara, Calif. As another example, processor 111 can be an Application Specific Integrated Circuit (ASIC). An example of bus 112 is a peripheral component interconnect ("PCI") local bus, which is a high performance bus for interconnecting chips (e.g., motherboard chips, mainboard chips, etc.), expansion boards, processor/memory subsystems, and so on. Network port 113 can be an Ethernet port, a serial port, a parallel port, an Universal Serial Bus ("USB") port, an IEEE 1394 port, a Small Computer Systems Interface ("SCSI") port, a Personal Computer Memory Card International Association ("PCMCIA") port, and so on. Memory 114 of computer 110 can store a plurality of instructions configured to be executed by processor 111. Memory 114 may be a random access memory (RAM), a dynamic RAM (DRAM), a static RAM (SRAM), a volatile memory, a non-volatile memory, a flash RAM, polymer ferroelectric RAM, Ovonics Unified Memory, magnetic RAM, a cache memory, a hard disk drive, a magnetic storage device, an optical storage device, a magneto-optical storage device, or a combination thereof. Memory 114 of computer 110 can store a plurality of instructions configured to be executed by processor 111.

As used to describe embodiments of the present invention, the term "coupled" encompasses a direct connection, an indirect connection, or a combination thereof. Two devices that are coupled can engage in direct communications, in indirect communications, or a combination thereof. Moreover, two devices that are coupled need not be in continuous communication, but can be in communication typically, periodically, intermittently, sporadically, occasionally, and so on.

Memory 114 can include an e-mail application 115. An example of an e-mail application includes Lotus Notes® from Lotus Development Corporation of Cambridge, Mass. Another example of an e-mail application is Microsoft Outlook® from Microsoft Corporation of Redmond, Wash. A typical e-mail application 115 can include a filter that examines an incoming e-mail and can take an action based on the setting of the filter and the content of the incoming e-mail. For example, a user's incoming e-mail is typically stored in an inbox folder 117. The user can establish a filter that sends all e-mail from a certain source (e.g., unwanted.sender@junkmail.net) to a junk folder 116. Thus, when computer 110 receives unwanted e-mail 50 from server 70, e-mail application 115 can include a filter that sends unwanted e-mail 50 to junk folder 116 instead of inbox 117. Computing and communications resources of computer 110, server 70, and the communications link between computer 110 and server 70 are consumed when unwanted e-mail 50 is sent to computer 110. In view of the foregoing, it can be appreciated that a substantial need exists for systems and methods that can advantageously provide for blocking delivery of an electronic communication.

BRIEF SUMMARY OF THE INVENTION

Embodiments of the present invention relate to systems and methods for blocking delivery of an electronic communication. In an embodiment, a method includes receiving at least a portion of a first electronic communication that includes a first electronic communication source address and a first electronic communication recipient address. User electronic communication blocking profile data is accessed and includes a plurality of user electronic communication blocking records. Each user electronic communication blocking record of at least a subset of the plurality of user electronic communication blocking records includes a recipient identifier field to store a recipient identifier and a sender identifier field to store a sender identifier. A first user electronic communication blocking record is selected based at least in part on the first electronic communication source address and the first electronic communication recipient address. Delivery of the first electronic communication to the first electronic communication recipient address is blocked based at least in part on the selected first user electronic communication blocking record.

In accordance with another embodiment of the present invention, a method for blocking delivery of one or more electronic mail messages transmitted under the Simple Mail Transfer Protocol ("SMTP") includes receiving at least a portion of a first e-mail message that includes at least a first e-mail sender address and a first e-mail recipient address. User e-mail blocking profile data is accessed, which includes a plurality of user e-mail blocking records. Each user e-mail blocking record of at least a subset of the plurality of user e-mail blocking records includes a recipient identifier field to store a recipient identifier and a sender identifier field to store a sender identifier. A first user e-mail blocking record is selected based at least in part on the first e-mail sender address and the first e-mail recipient address. Delivery of the first e-mail message to the first e-mail recipient address is blocked based at least in part on the selected first user e-mail blocking record.

A further embodiment of the present invention is a system for blocking delivery of an electronic communication including a network port, a processor, and a memory storing a plurality of instructions to be executed by the processor. The plurality of instructions include instructions to receive at least a portion of the electronic communication, which includes an electronic communication source address and an electronic communication recipient address. The instructions include instructions to access user electronic communication blocking profile data that includes a plurality of user electronic communication blocking records. Each user electronic communication blocking record of at least a subset of the plurality of user electronic communication blocking records includes a recipient identifier field to store a recipient identifier and a sender identifier field to store a sender identifier. The memory also stores instructions to select a user electronic communication blocking record based at least in part on the electronic communication source address and the electronic communication recipient address and block delivery of the electronic communication to the electronic communication recipient address based at least in part on the selected user electronic communication blocking record.

In accordance with a further embodiment of the present invention, a method for blocking delivery of an electronic communication includes a step for receiving at least a portion of the electronic communication that includes an electronic communication source address and an electronic communication recipient address and a step for accessing user electronic communication blocking profile data. The user electronic communication blocking profile data includes a plurality of user electronic communication blocking records, and each user electronic communication blocking record of at least a subset of the plurality of user electronic communication blocking records includes a recipient identifier field to store a recipient identifier and a sender identifier field to store a sender identifier. The method also includes a step for selecting a user electronic communication blocking record based at least in part on the electronic communication source address and the electronic communication recipient address, and a step for blocking delivery of the electronic communication to the electronic communication recipient address based at least in part on the selected user electronic communication blocking record.

According to another embodiment of the present invention, a computer-readable medium stores a plurality of instructions to be executed by a processor for blocking delivery of an electronic communication. The plurality of instructions include (i) instructions to receive at least a portion of the electronic communication, which includes an electronic communication source address and an electronic communication recipient address, and (ii) instructions to access user electronic communication blocking profile data, which includes a plurality of user electronic communication blocking records. Each user electronic communication blocking record of at least a subset of the plurality of user electronic communication blocking records includes a recipient identifier field to store a recipient identifier and a sender identifier field to store a sender identifier. The plurality of instructions also include instructions to select a user electronic communication blocking record based at least in part on the electronic communication source address and the electronic communication recipient address, and instructions to block delivery of the electronic communication to the electronic communication recipient address based at least in part on the selected user electronic communication blocking record.

Another embodiment of the present invention is a system for blocking delivery of an electronic communication. The system includes means for receiving at least a portion of the electronic communication, which includes an electronic communication source address and an electronic communication recipient address. Means for accessing user electronic communication blocking profile data are included, and the user electronic communication blocking profile data includes a plurality of user electronic communication blocking records. Each user electronic communication blocking record of at least a subset of the plurality of user electronic communication blocking records includes a recipient identifier field to store a recipient identifier and a sender identifier field to store a sender identifier. The system also includes means for selecting a user electronic communication blocking record based at least in part on the electronic communication source address and the electronic communication recipient address, and means for blocking delivery of the electronic communication to the electronic communication recipient address based at least in part on the selected user electronic communication blocking record.

DETAILED DESCRIPTION OF THE INVENTION

According to an embodiment of the present invention, a system includes an e-mail blocking service. A user can select one or more e-mail addresses from which she does not want to receive e-mail. For example, an e-mail application can include a selection on a drop-down menu to select a block e-mail function. The e-mail application can present a window to the user that allows the user to enter an e-mail address that is to be blocked. In an embodiment of the present invention, the window lists e-mail addresses that are already specified as blocked. The e-mail application can communicate the blocked e-mail addresses to a mail server associated with the user. The mail server can then block delivery of e-mail from the e-mail address to the user.

Figure 1:
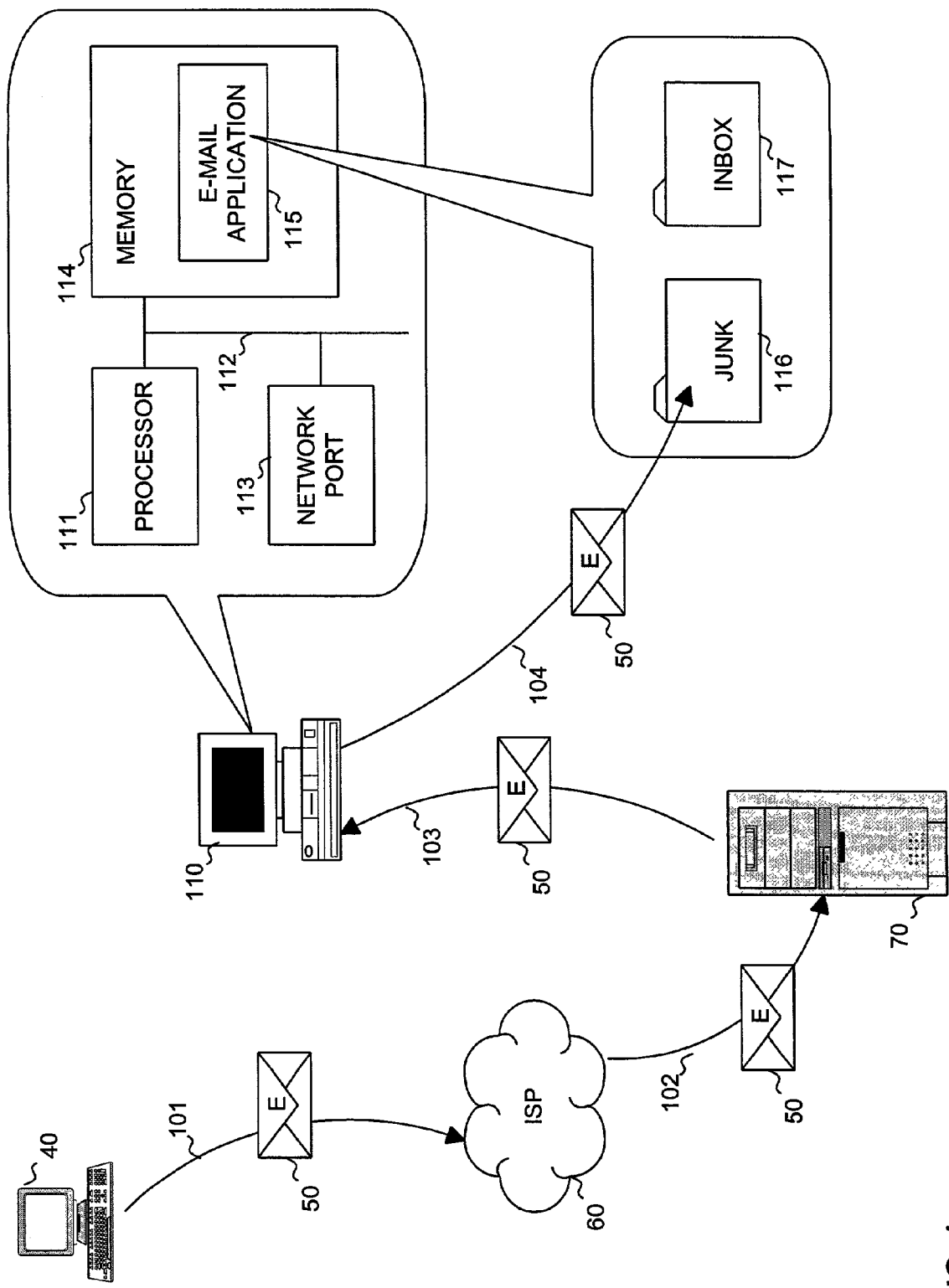
FIG. 1 is a schematic diagram of a known system for processing unwanted e-mail.
Figure 2:
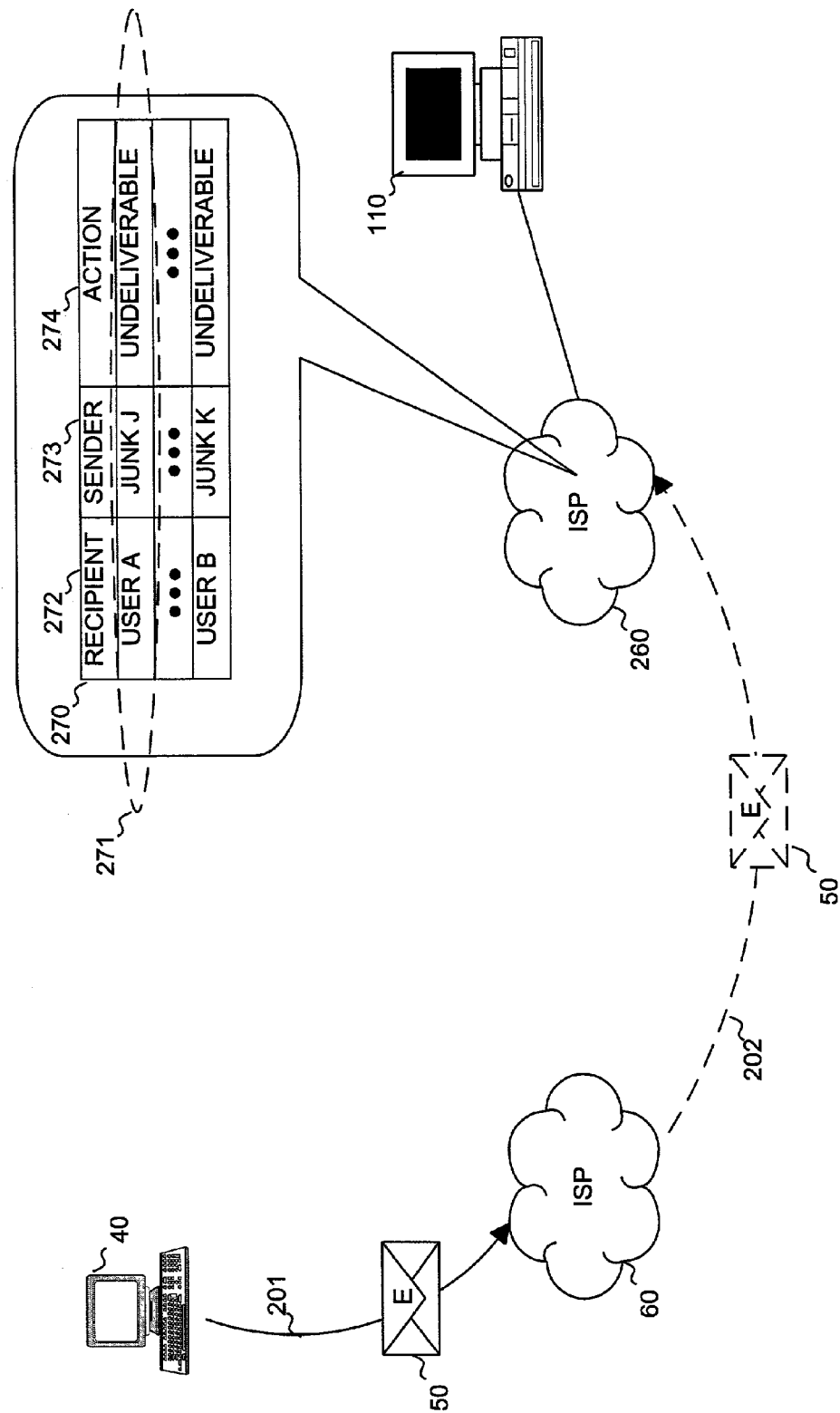
FIG. 2 is a schematic diagram of an embodiment of the present invention.

FIG. 2 is a schematic diagram of an embodiment of the present invention. Computer 40 associated with a junk e-mailer can send unwanted e-mail 50 to ISP 60 (step 201), which is an ISP associated with the junk e-mailer. ISP 60 can attempt to send unwanted e-mail 50 to ISP 260 (step 202). ISP 260 is an ISP associated with a user. However, ISP 260 can block receipt of unwanted e-mail 50 based at least in part on user e-mail blocking profile data. When ISP 260 blocks receipt of the unwanted e-mail 50, resources such as the communications channel between ISP 260 and computer 110, ISP 260, and computer 110 are not burdened by communication of unwanted e-mail 50 from ISP 260 to computer 110.

Unwanted e-mail 50 is an example of an electronic communication that can be blocked in accordance with embodiments of the present invention. Examples of other electronic communications in accordance with embodiments of the present invention include instant messages and so on.

In an embodiment of the present invention, ISP 60 and ISP 260 communicate e-mail using the Simple Mail Transfer Protocol ("SMTP"). The SMTP is based on a model of communication where a user e-mail request leads to the establishment of a two-way transmission channel between a sender-SMTP and a receiver-SMTP. The transmission channel can communicate a mail transaction that can include one or more e-mails from one or more senders to one or more recipients. SMTP commands are generated by the sender-SMTP and sent to the receiver-SMTP. SMTP replies are sent from the receiver-SMTP to the sender-SMTP in response to the commands.

Figure 3:
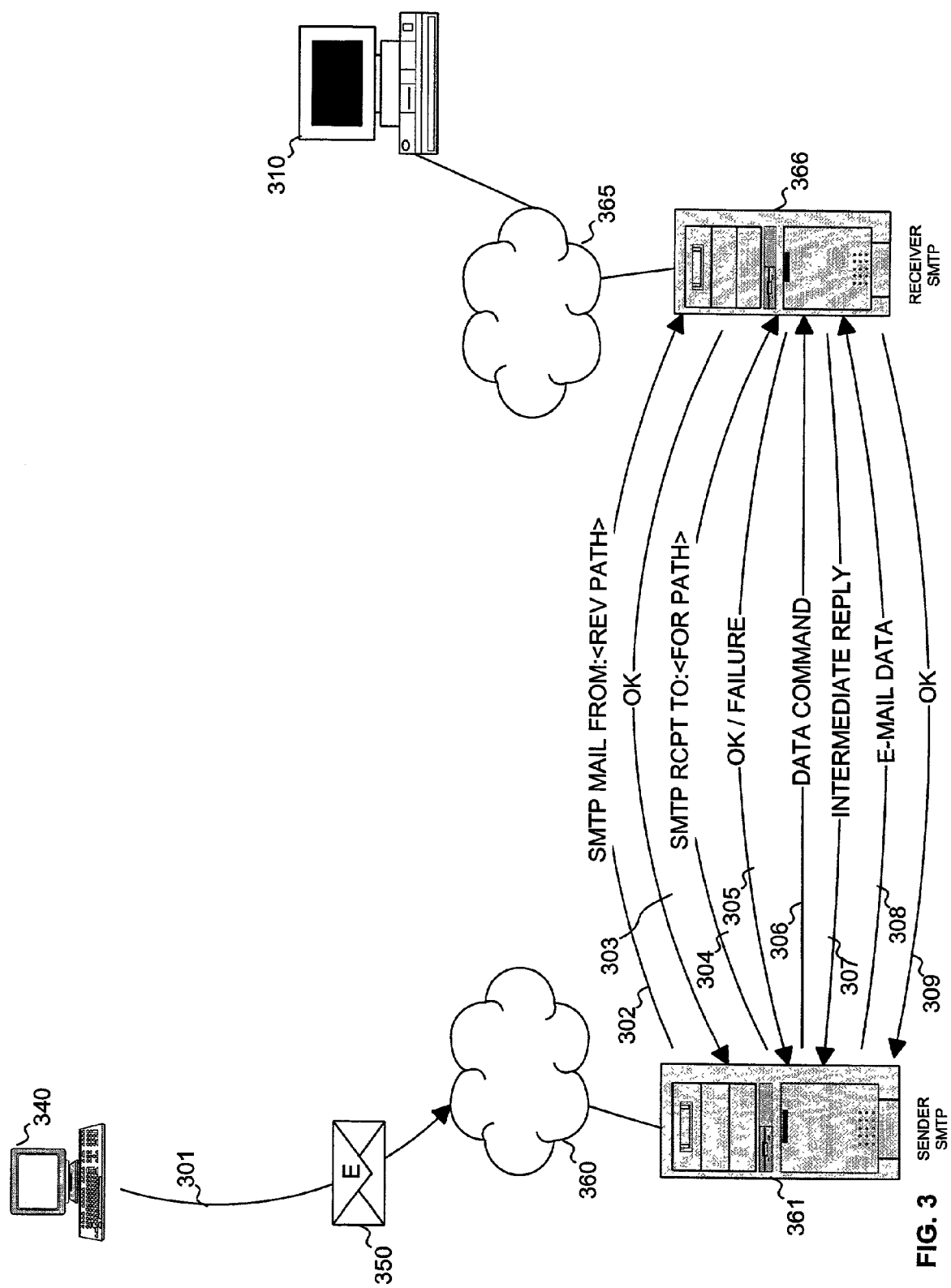
FIG. 3 is a schematic diagram of a system communicating an e-mail message using the SMTP.

FIG. 3 is a schematic diagram of a system communicating an e-mail message using the SMTP. A computer 340 can send an e-mail 350 to network 360 (step 301), and e-mail 350 can be addressed to a user associated with computer 310 and network 365. Network 360 can include a sender SMTP 361, and network 365 can include a receiver SMTP 366. After the transmission channel is established, the sender SMTP 361 sends a MAIL command indicating the sender of the e-mail (e.g., e-mail 350) (step 302). The argument to the MAIL command is a reverse-path that specifies who the mail is from, e.g., the e-mail address of the sender of the e-mail. For example, a MAIL command can be as follows: MAIL FROM:<junk.mailer@junkmail.net>. The receiver SMTP 366 can respond with an "OK" reply (e.g., a "250 OK" reply) when it can accept the e-mail (step 303). The sender SMTP 361 then sends a RCPT command that identifies the recipient of the e-mail (step 304). The argument to the RCPT command is a forward-path that specifies who the mail is being sent to, e.g., the e-mail address of the recipient of the e-mail. For example, a RCPT command can be as follows: RCPT TO:<user@network.net>. The receiver SMTP 366 can respond with an OK reply when it can accept mail for that recipient, and when the receiver SMTP 366 cannot accept mail for that recipient, it can reply with a failure message (e.g., a "550 failure" message) rejecting that recipient (step 305). The sender SMTP 361 and receiver SMTP 366 can negotiate several recipients. When the recipients have been negotiated, the sender SMTP 361 sends a DATA command (step 306). If the receiver SMTP 366 can accept the data, it replies with an intermediate reply (e.g., a "354" intermediate reply) (step 307) and will consider all succeeding lines sent by sender SMTP 361 (step 308) to be the e-mail data (e.g., e-mail message text). The e-mail data can include data such as date, subject, to, cc, from, e-mail body text, and so on. When the end of the data is received (e.g., indicated by a "<CRLF>.<CRLL>"), the receiver SMTP 366 sends an OK reply (e.g., a "250 OK" reply) (step 309).

The following example shows SMTP commands and replies associated with an e-mail sent by junk.mailer at host junkmail.net to a user1, user2, and user3 at host network.net, when SMTP-S is a sender SMTP and SMTP-R is a receiver SMTP.

SMTP-S: MAIL FROM:<junk.mailer@junkmail.net>
SMTP-R: 250 OK
SMTP-S: RCPT TO:<user1@network.net>
SMTP-R: 250 OK
SMTP-S: RCPT TO:<user2@network.net>
SMTP-R: 550 No such user here
SMTP-S: RCPT TO:<user3@network.net>
SMTP-R: 250 OK
SMTP-S: DATA
SMTP-R: 354 Start mail input; end with <CRLF>.<CRLF>
SMTP-S: walla walla blah blah walla walla blah blah
SMTP-S: walla walla blah blah walla walla blah blah
SMTP-S: <CRLF>.<CRLF>
SMTP-R: 250 OK In the foregoing example, the mail for user1 and user 3 was accepted, and the mail for user 2 was rejected.

The e-mail address specified in the return path can be different from the actual sender's e-mail address. For example, an e-mail sender may specify a different return path e-mail address when error messages are to be delivered to a particular e-mail mailbox.

Figure 4:
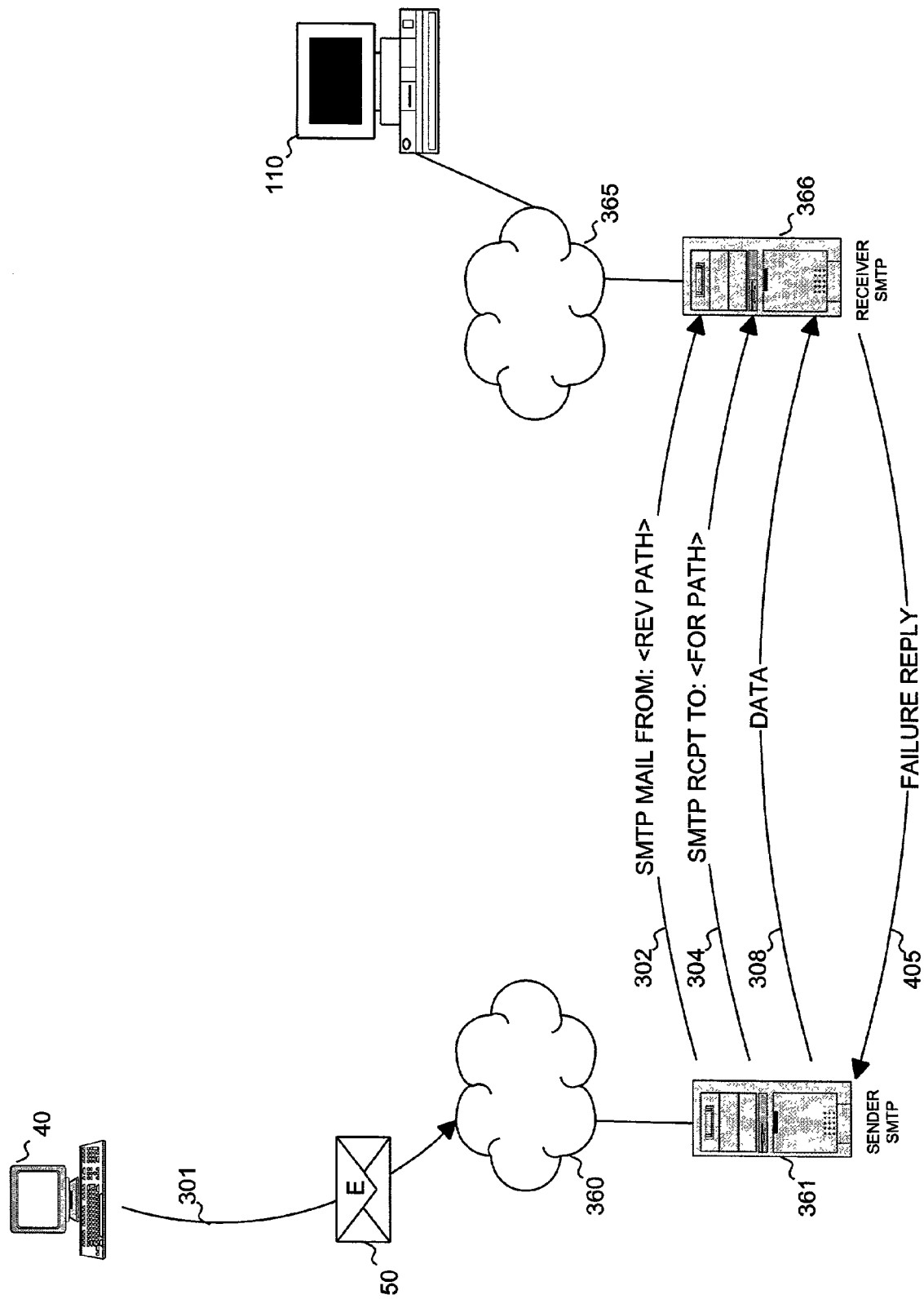
FIG. 4 is a schematic diagram of the system illustrated in FIG. 3 after processing of e-mail messages has occurred.

After a receiver SMTP has received and replied to the end of mail data command (e.g., <CRLF>.<CRLF>), processing of the e-mail messages may not be successful. FIG. 4 is a schematic diagram of the system illustrated in FIG. 3 after processing of e-mail messages has occurred. For example, after processing a number of e-mail messages, the receiver SMTP 366 may determine that an e-mail cannot be delivered to a recipient because a mailbox space allocation of the recipient was exceeded. The receiver SMTP 366 can compose and send an "undeliverable mail" notification to the sender of the e-mail message (e.g., via the return path) (step 405).

Referring again to FIG. 2, ISP 60 can send e-mail messages to ISP 260 (step 202). ISP 260 can accept or reject e-mail messages based on user e-mail blocking profile data. In an embodiment, ISP 60 can e-mail messages to a network, and the network can accept or reject e-mail messages based on user e-mail blocking profile data. Examples of a network include a Wide Area Network (WAN), a Local Area Network (LAN), the Internet, an intranet, a wireless network, a wired network, a connection-oriented network, a packet network, an Internet Protocol (IP) network, or a combination thereof.

For example, ISP 260 can include user e-mail blocking profile data 270, which can include one or more user e-mail blocking records 271. A user e-mail blocking record 271 can include a recipient field 272 to store a recipient identifier, a sender field 273 to store a sender identifier, and an action field 274 to store an action identifier. In an embodiment, a user's e-mail application can communicate to ISP 260 the data for a user e-mail blocking record. In another embodiment, a user can communicate the user e-mail blocking record via an e-mail message. In a further embodiment, an ISP can receive user e-mail blocking record data via a form posted on the World Wide Web ("WWW" or the "Web"). When the ISP 260 receives an e-mail message from ISP 60, the ISP 260 can access the user e-mail blocking profile data 270 to determine whether the user e-mail blocking profile data 270 includes a user e-mail blocking record corresponding to the e-mail message.

For example, ISP 60 can establish an SMTP transmission channel with ISP 260. When ISP 60 indicates that a sender of unwanted e-mail message 50 is a JUNK J and that the recipient is User A, ISP 260 can access user e-mail blocking profile data 270, identify user e-mail blocking record 271, and reply to ISP 60 with a failure reply indicating that the unwanted e-mail 50 is undeliverable as specified by the action field 274 of the user e-mail blocking record 271.

Figure 5:
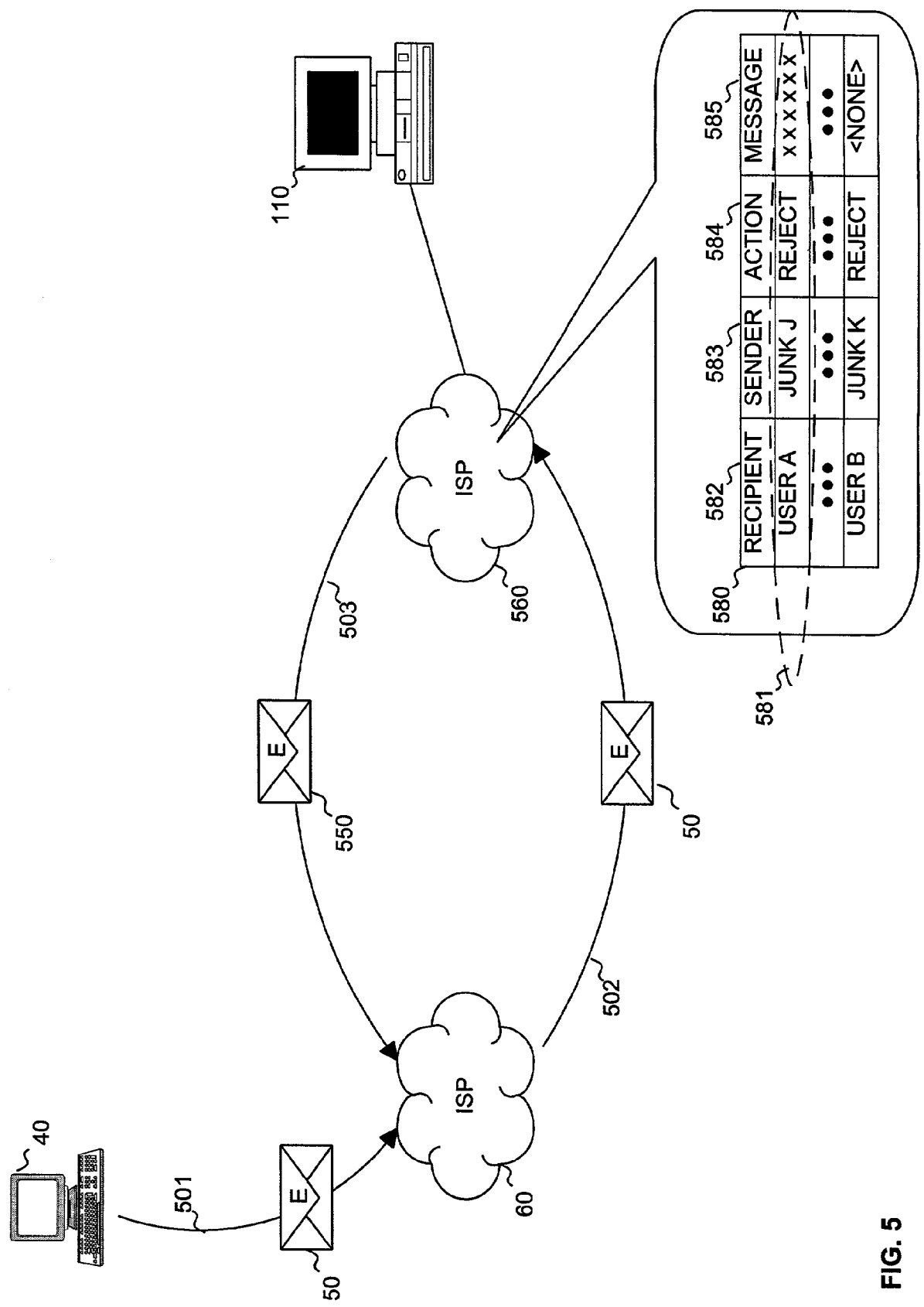
FIG. 5 is a schematic diagram of another system in accordance with an embodiment of the present invention.

FIG. 5 is a schematic diagram of another system in accordance with an embodiment of the present invention. ISP 60 can receive unwanted e-mail 50 (step 501) and send unwanted e-mail 50 to ISP 560 (step 502). ISP 560 can access a user e-mail blocking profile data 580 including one or more user e-mail blocking records 581. A user e-mail blocking record 581 can include a recipient field 582 to store a recipient identifier, a sender field 583 to store a sender identifier, an action field 584 to store an action identifier, and a message field 585 to store a message. When ISP 560 processes unwanted e-mail message 50 and determines that JUNK J is the sender and that User A is the recipient, ISP 560 can access user e-mail blocking profile data 580, identify user e-mail blocking record 581, and determine that the unwanted e-mail 50 is to be rejected with a message "x x x x x x." For example, ISP 560 can send an rejection message e-mail 550 to the specified return path of unwanted e-mail 50, and rejection message e-mail 55 can include the message "x x x x x x "(e.g., "Mail undeliverable," "Leave me alone," "Don't tread on me," "Buzz off," "Remove me from your mailing list," and so on).

Figure 6:
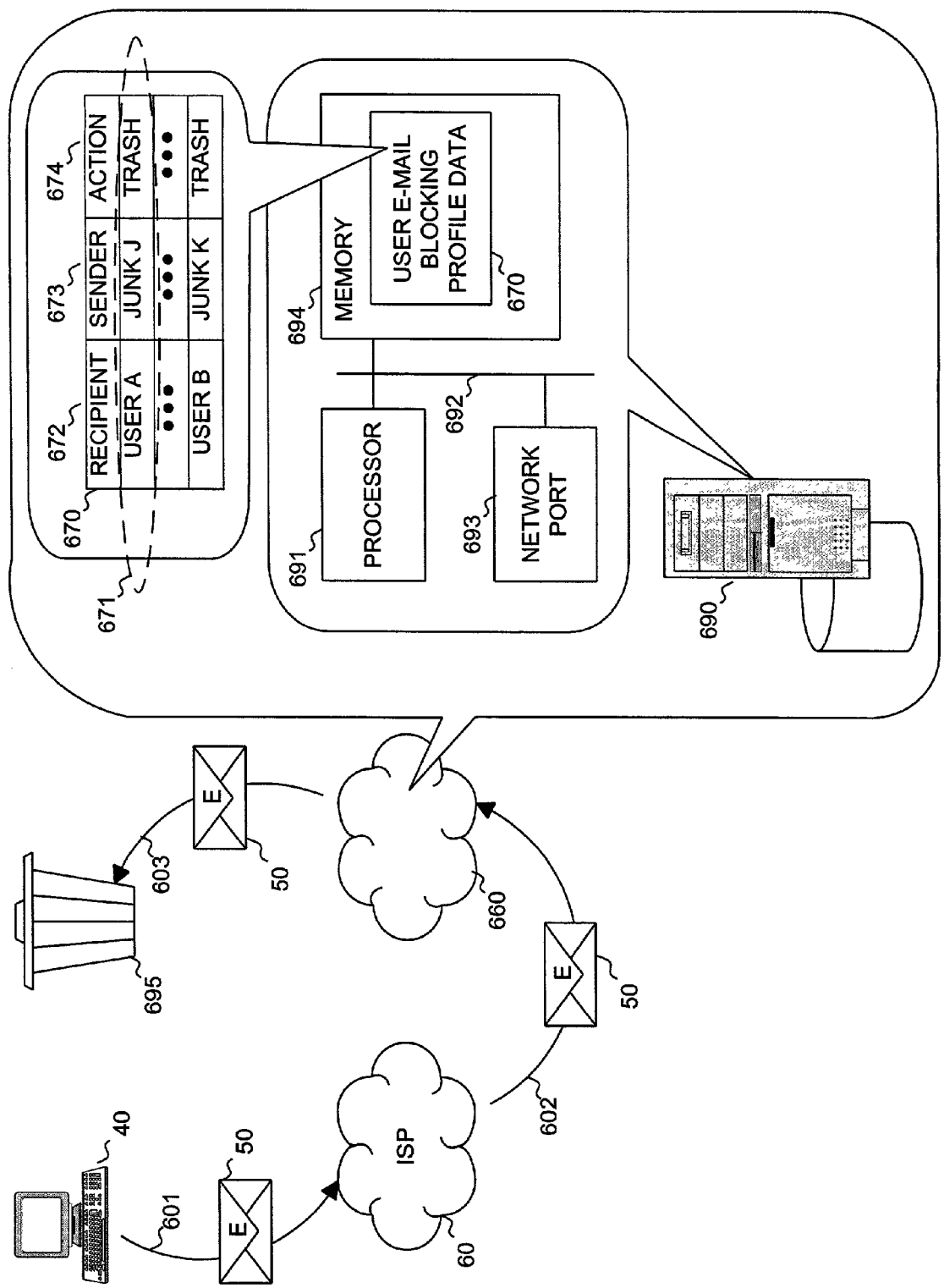
FIG. 6 is a schematic diagram of another system in accordance with an embodiment of the present invention.

FIG. 6 is a schematic diagram of another system in accordance with an embodiment of the present invention. ISP 60 can receive unwanted e-mail 50 (step 601) and send unwanted e-mail 50 to network 660 (step 602). Network 660 can access a user e-mail blocking profile data 670 including one or more user e-mail blocking records 671. In an embodiment, the user e-mail blocking profile data 670 is stored on server 690. Server 690 can include a processor 691 coupled via bus 692 to network port 693 and memory 694. In an embodiment, memory 694 can include the user e-mail blocking profile data 670.

A user e-mail blocking record 671 can include a recipient field 672 to store a recipient identifier, a sender field 673 to store a sender identifier, and an action field 674 to store an action identifier. When network 660 processes unwanted e-mail message 50 and determines that JUNK J is the sender and that User A is the recipient, network 660 can access user e-mail blocking profile data 670, identify user e-mail blocking record 671, and determine that the unwanted e-mail 50 is to be sent to an electronic trash can 695 (step 603). In an embodiment, unwanted e-mails sent to an electronic trash can are deleted. In another embodiment, unwanted e-mails sent to an electronic trash can are stored for a period of time (e.g., one day, one week, one month, etc) before being deleted.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Embodiments of systems and methods for electronic communication blocking have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive.

What is claimed is:

1. A method for blocking an electronic communication, the method comprising:

receiving at least a portion of a first electronic communication, the first electronic communication including a first electronic communication source address and a first electronic communication recipient address;

accessing user electronic communication blocking profile data, the user electronic communication blocking profile data including a plurality of user electronic communication blocking records, each user electronic communication blocking record of at least a subset of the plurality of user electronic communication blocking records including a recipient identifier field to store a recipient identifier and a sender identifier field to store a sender identifier;

selecting a first user electronic communication blocking record of a plurality of blocking records for at least two of a plurality of recipient addresses based at least in part on the first electronic communication source address and the first electronic communication recipient address;

blocking delivery of the first electronic communication to the first electronic communication recipient address based at least in part on the selected first user electronic communication blocking record;

receiving at least a portion of a second electronic communication, the second electronic communication including a second electronic communication source address and a second electronic communication recipient address, the second electronic communication recipient address being different from the first electronic communication recipient address;

selecting a second user electronic communication blocking record from at least two of a plurality of blocking records based at least in part on the second electronic communication source address and the second electronic communication recipient address; and blocking delivery of the second electronic communication to the second electronic recipient address based at least in part on the selected second user electronic communication blocking record;

wherein blocking delivery of the first electronic communication includes sending a failure message to the source, wherein the failure message is an indication that the transmission of the e-mail message has permanently failed;

wherein each user electronic communication blocking record of at least a subset of the plurality of user electronic communication blocking records further includes a message field to store a message;

wherein blocking delivery of the first electronic communication to the first electronic recipient address includes sending an electronic communication to the first electronic communication source address, the electronic communication to the first electronic communication source address including at least in part a message stored in the message field of the selected first user electronic communication blocking record;

wherein each user electronic communication blocking record of at least a subset of the plurality of user electronic communication blocking records further includes an action identifier field to store an action identifier;

wherein blocking deliver of the first electronic communication to the first electronic recipient address includes deleting the first electronic communication; and wherein blocking delivery of the first electronic communication includes indicating that the first electronic communication cannot be accepted.

2. The method of claim 1, wherein the electronic communication is an electronic mail message.

3. The method of claim 1, wherein the electronic communication is an instant message.

4. A method for blocking delivery of one or more electronic mail ("e-mail") messages transmitted under the Simple Mail Transfer Protocol ("SMTP"), the method comprising:

establishing an SMTP transmission channel with a sender SMTP, the SMTP transmission channel communicating at least a portion of a first e-mail message;

receiving the at least a portion of a first e-mail message, the first e-mail message including at least a first e-mail sender address and a first e-mail recipient address;

accessing user e-mail blocking profile data, the user e-mail blocking profile data including a plurality of user e-mail blocking records, each user e-mail blocking record of at least a subset of the plurality of user e-mail blocking records including a recipient identifier field to store a recipient identifier and a sender identifier field to store a sender identifier;

selecting a first user e-mail blocking record of a plurality of blocking records for at least two of a plurality of recipient addresses based at least in part on the first e-mail sender address and the first e-mail recipient address;

blocking delivery of the first e-mail message to the first e-mail recipient address based at least in part on the selected first user e-mail blocking record;

receiving at least a portion of a second e-mail message, the second e-mail message including at least a second e-mail sender address and a second e-mail recipient address, the second e-mail recipient address being different from the first e-mail recipient address;

selecting a second user e-mail blocking record based at least in part on the second e-mail sender address and the second e-mail recipient address; and blocking delivery of the second e-mail message to the second e-mail recipient address based at least in part on the selected second user e-mail blocking record;

wherein receiving the at least a portion of the first e-mail message includes receiving the first e-mail sender address as part of an SMTP MAIL command and the first e-mail recipient address as part of an SMTP RCPT command;

wherein blocking delivery of the first e-mail message to the first e-mail recipient address based at least in part on the selected first user e-mail blocking record includes sending a failure message to the SMTP receiver in response to the SMTP RCPT command, wherein the failure message is an indication that the transmission of the e-mail message has permanently failed;

wherein the failure message includes at least in part a message from the selected first user e-mail blocking record;

wherein the failure message indicates that e-mail cannot be delivered to the first e-mail recipient address;

wherein receiving at least a portion of a first e-mail message includes receiving at least the first e-mail message subsequent to receiving an SMTP DATA command;

wherein blocking delivery of the first e-mail message to the first e-mail recipient address based at least in part on the selected first user e-mail blocking record includes sending an e-mail blocked message to the first e-mail sender address; and wherein blocking delivery of the first e-mail message to the first e-mail recipient address based at least in part on the selected first user e-mail blocking record includes deleting the first e-mail message.

5. A system for blocking delivery of an electronic communication, the system comprising:
  a network port;
  a processor coupled to the network port; and
  a memory coupled to the processor, the memory storing a plurality of instructions to be executed by the processor, the plurality of instructions including instructions to:
    receive at least a portion of the electronic communication, the electronic communication including an electronic communication source address and an electronic communication recipient address,
    access user electronic communication blocking profile data, the user electronic communication blocking profile data including a plurality of user electronic communication blocking records of a plurality of blocking records for at least two of a plurality of recipient addresses, each user electronic communication blocking record of at least a subset of the plurality of user electronic communication blocking records including a recipient identifier field to store a recipient identifier and a sender identifier field to store a sender identifier,
    select a user electronic communication blocking record based at least in part on the electronic communication source address and the electronic communication recipient address, and
    block delivery of the electronic communication to the electronic communication recipient address based at least in part on the selected user electronic communication blocking record;
  wherein the electronic communication is an electronic mail message;
  wherein each user electronic communication blocking record of at least a subset of the plurality of user electronic communication blocking records further includes an action identifier field to store an action identifier;
  wherein each user electronic communication blocking record of at least a subset of the plurality of user electronic communication blocking records further includes a message field to store a message;
  wherein blocking delivery of the electronic communication includes sending a failure message to the source address, wherein the failure message is an indication that the transmission of the electronic communication has permanently failed;
  wherein blocking delivery of the electronic communication to the electronic recipient address includes sending an electronic communication to the electronic communication source address, the electronic communication to the electronic communication source address including at least in part a message stored in the message field of the selected user electronic communication blocking record; and
  wherein each user electronic communication blocking record of at least a subset of the plurality of user electronic communication blocking records further includes an action identifier field to store an action identifier.

6. A computer-readable medium storing a plurality of instructions to be executed by a processor for blocking delivery of an electronic communication, the plurality of instructions comprising instructions to:
  receive at least a portion of the electronic communication, the electronic communication including an electronic communication source address and an electronic communication recipient address;
  access user electronic communication blocking profile data, the user electronic communication blocking profile data including a plurality of user electronic communication blocking records, each user electronic communication blocking record of at least a subset of the plurality of user electronic communication blocking records including a recipient identifier field to store a recipient identifier and a sender identifier field to store a sender identifier;
  select a user electronic communication blocking record based at least in part on the electronic communication source address and the electronic communication recipient address; and
  block delivery of the electronic communication to the electronic communication recipient address based at least in part on the selected user electronic communication blocking record;
  wherein each user electronic communication blocking record of at least a subset of the plurality of user electronic communication blocking records further includes an action identifier field to store an action identifier;
  wherein each user electronic communication blocking record of at least a subset of the plurality of user electronic communication blocking records further includes a message field to store a message;
  wherein the instructions to block delivery of the electronic communication to the electronic recipient address include instructions to send an electronic communication to the electronic communication source address, the electronic communication to the electronic communication source address including at least in part a message stored in the message field of the selected user electronic communication blocking record;
  wherein each user electronic communication blocking record of at least a subset of the plurality of user electronic communication blocking records further includes an action identifier field to store an action identifier;
  wherein the electronic communication is an electronic mail message and
  wherein blocking delivery of the electronic communication includes sending a failure message to the source address, wherein the failure message is an indication that the transmission of the electronic communication has permanently failed.

7. A system for blocking delivery of an electronic communication, the system comprising:
  means for receiving at least a portion of the electronic communication, the electronic communication including an electronic communication source address and an electronic communication recipient address;
  means for accessing user electronic communication blocking profile data, the user electronic communication blocking profile data including a plurality of user electronic communication blocking records, each user electronic communication blocking record of at least a subset of the plurality of user electronic communication blocking records including a recipient identifier field to store a recipient identifier and a sender identifier field to store a sender identifier;
  means for selecting a user electronic communication blocking record of a plurality of blocking records for at least two of a plurality of recipient addresses based at least in part on the electronic communication source address and the electronic communication recipient address; and means for blocking delivery of the electronic communication to the electronic communication recipient address based at least in part on the selected user electronic communication blocking record;

wherein each user electronic communication blocking record of at least a subset of the plurality of user electronic communication blocking records further includes a message field to store a message;

wherein the means for blocking delivery of the electronic communication to the electronic recipient address includes means for sending an electronic communication to the electronic communication source address, the electronic communication to the electronic communication source address including at least in part a message stored in the message field of the selected user electronic communication blocking record;

wherein the electronic communication is an electronic mail message;

wherein the means for blocking delivery of the electronic communication to the electronic recipient address includes means for deleting the electronic communication; and wherein means for blocking delivery of the electronic communication includes means for sending a failure message to the source address, wherein the failure message is an indication that the transmission of the electronic communication has permanently failed.

* * * * *